UNITED STATES PATENT OFFICE.

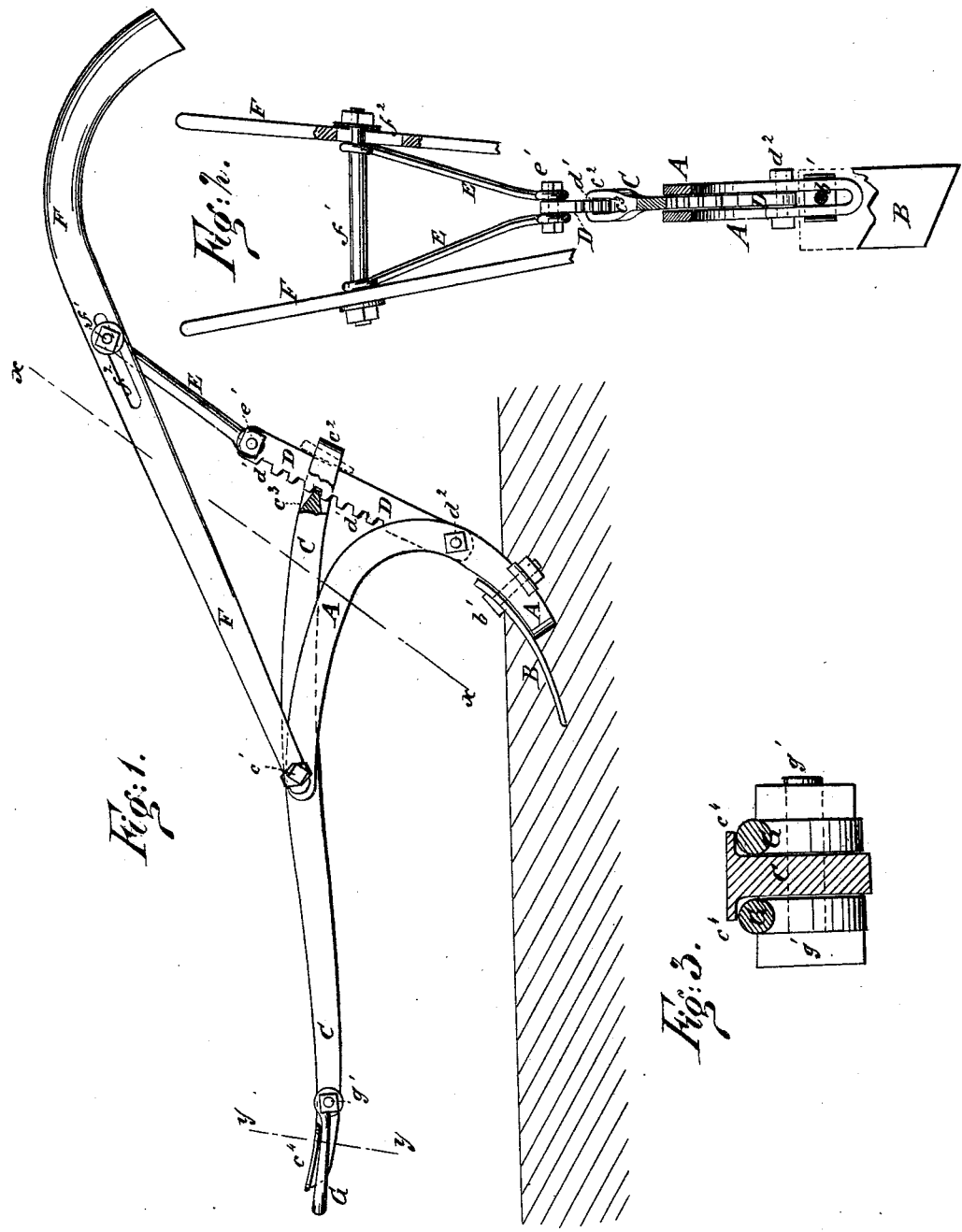

ASA NEWSOM, OF VALDOSTA, GEORGIA.

IMPROVEMENT IN PLOWS.

Specification forming part of Letters Patent No. 218,558, dated August 12, 1879; application filed May 26, 1879.

*To all whom it may concern:*

Be it known that I, ASA NEWSOM, of Valdosta, in the county of Lowndes and State of Georgia, have invented a new and useful Improvement in Plows, of which the following is a specification.

Figure 1 is a side view of a plow to which my improvement has been applied. Fig. 2 is a detail section taken through the line $x\ x$, Fig. 1. Fig. 3 is a detail section taken through the line $y\ y$, Fig. 1.

Similar letters of reference indicate corresponding parts.

The object of this invention is to improve the construction of the plow for which Letters Patent No. 199,736 were granted to me January 29, 1878, so as to make it more convenient and reliable in use and more readily adjusted.

The invention consists in combining a curved slotted standard, a plow-beam secured between upper ends of standard and provided with an extension having an eye, and bars that connect the standard and handles.

A represents the plow-standard, which is curved or bent, as shown in Fig. 1, and is slotted longitudinally from its upper end nearly to its lower end, or it may be formed of a bar of iron bent laterally at its center into U form, and then bent edgewise into the desired shape. To the forward side of the lower end of the standard A is secured the shovel B by a bolt, $b'$, passing through it and through the slot of the said standard. C is the plow-beam, which is secured to and between the upper ends of the standard A by a bolt, $c^1$. The rear end of the beam C projects beyond the bend of the standard A, and has an eye, $c^2$, formed through it to receive the bar D. In the beam C, at the forward side of its eye $c^2$, is formed one or more teeth, $c^3$, to engage with the teeth $d^1$, formed upon the forward edge of the bar D. The lower end of the bar D is placed in the lower part of the slot in the standard A, and is secured to the said standard by a bolt, $d^2$.

To the opposite sides of the upper end of the bar D are secured, by a bolt, $e'$, the lower ends of the brace-bars E, the upper ends of which are secured to the round $f^1$, that connects the handles F at the inner sides of the said handles. The forward ends of the handles F are secured to the opposite sides of the forward end of the standard A by the bolt $c^1$, that secures the plow-beam C to the said standard A. The handles F have longitudinal slots $f^2$ formed in them to receive the round $f^1$, so that by loosening the nuts upon the ends of the said round $f^1$ the handles F may be lowered or raised, as the height of the plowman may require.

By this construction, when the handles F are lowered to accommodate a boy or small man, the rear ends of the said handles will be drawn toward each other proportionally, so that they will be adjusted in height and in distance apart at the same time.

With this construction, by loosening the nut of the bolt $e'$, the bar D may be moved to the rearward sufficiently to disengage the teeth $d^1$ of the said bar D from the tooth or teeth $c^3$ of the beam C, so that the said beam C may be readily adjusted to give any desired pitch to the plow.

G is the clevis to which the draft is applied. The arms of the clevis G are placed upon the opposite sides of the forward end of the plow-beam C, and are secured at their ends to the said plow-beam C by a bolt, $g'$. Upon the upper part of the opposite sides of the forward end of the plow-beam C are formed lips or shoulders $c^4$, for the arms of the clevis G to strike against, and thus hold the said beam level and steady.

Having thus described my invention, I claim as new and desire to secure by Letters Patent—

The combination of the curved slotted standard A, the plow-beam C, secured between its upper ends, and provided with an extension having eye $c^2$ and tooth $c^3$, the toothed bar D, and brace-bars E, connecting the standard and handles, as shown and described.

ASA NEWSOM.

Witnesses:
H. D. PARRAMORE,
BENJAMIN F. LINDSEY.